Patented Dec. 4, 1934

1,982,809

UNITED STATES PATENT OFFICE 1,982,809

COMPOSITION OF MATTER ADAPTED FOR COLD MOLDING, MOLDED PRODUCTS PRODUCED THEREFROM AND PROCESS OF MAKING SAME

Clarence A. Herbst, Park Ridge, and John D. Endriz, Berwyn, Ill., assignors to Economy Fuse & Manufacturing Company, Chicago, Ill., a corporation of New York No Drawing. Application September 28, 1931, Serial No. 565,690

10 Claims. (Cl. 18—55)

This invention relates to a new composition of matter produced from a cumarone-indene resin characterized by containing in its composition, a quantity of sulphur.

This invention further relates to the process of producing said cumarone-indene composition and also to the process of producing finished articles of commerce therefrom by cold molding and subsequent heat treatment.

The invention also relates to the finished molded products.

Cold molding compositions and molded objects made therefrom are well known in the art and have received an extensive commercial use. As compared with hot molded compositions, they are generally considered less desirable due to the fact that they lack the mechanical and electrical properties of most hot molded compositions. However, in many uses, the mechanical and electrical properties are adequate and therefore they are extensively used in preference to hot molding products on account of the cheapness in cost of the materials entering into their composition and the relatively low expense involved in their process of production.

Accordingly it is an object of this invention to provide a new composition of matter which is adapted for cold molding operations and finished molded products made therefrom which possess higher dielectric strength than cold molding products heretofore obtained and which possess good mechanical strength for most commercial uses.

It is a further object of this invention to provide finished cold molded products which possess a pleasing black appearance produced from a substance which is easily moldable and capable of being formed into various odd shapes incident to this type of manufacture.

It is a further object of this invention to provide a cold molding composition produced by vulcanizing a cumarone-indene resin and by which the sulphur may be included in the finished molded products in quantity of approximately 40%. The sulphur imparts to the cumarone-indene resin, higher mechanical strength by virtue of its union with the resinous material and maintains or increases the high dielectric properties of the resin.

From the commercial standpoint, a further advantage may be realized which flows from the cost of the materials employed. At the present time, sulphur is quite cheap as compared to the cost of cumarone-indene resins so that by the inclusion of a relatively large amount of sulphur in the final product, the cost of the composing mixture may be materially reduced.

After considerable experimentation, the applicants have discovered certain characteristics concerning the vulcanizing reaction between cumarone-indene resins and sulphur and as a result have devised a process by which a maximum amount of sulphur may be incorporated as a combined constituent in the final product. The applicants have discovered that in order to provide a maximum sulphur content it is necessary in conducting the vulcanizing reaction, to employ sulphur in excess of the amount that is expected to remain in the final product.

This is due to the fact that certain attendant reactions occur producing hydrogen sulphide and perhaps other fugitive sulphur compounds which are eliminated during the vulcanizing reaction, and the subsequent heat treatment of the molded product. When a mixture of approximately 69 per cent of sulphur and 31 per cent of cumarone-indene resin is reacted, a resinous material is formed, containing approximately 40% of combined sulphur, which as far as the applicants can ascertain, is the highest possible percentage that can be permanently united with the resin.

The applicants believe that the mechanical and electrical properties of cumarone-indene resins are improved directly proportional to the quantity of combined sulphur up to the maximum percentage of 40%, above referred to which makes it desirable to secure the largest percentage of sulphur possible up to the maximum 40%.

By way of example, one preferred procedure will now be given by which the present invention may be practiced.

Three hundred and ten grams of cumarone-indene resin may be reacted with six hundred and ninety grams of sulphur, (preferably powdered) by the application of heat in an enclosure substantially free from admission of air. The temperature is maintained between four hundred eighty and five hundred degrees F. and the reaction conducted at this temperature for approximately sixteen hours. As the result, a vulcanized resinous product is formed.

It is preferred in producing a molding composition to add the other ingredients such as a suitable filler of asbestos or the like, prior to the vulcanizing reaction. The filler may be added in any suitable quantity, according to the nature of the molded articles being produced.

Therefore, in producing molded articles, the resin, sulphur and filling material in the prescribed proportions are thoroughly mixed to form a moldable mass which is then cold molded to impart the final physical shape to the articles being produced. The molded articles are then heat treated between a temperature of four hundred and eighty and five hundred degrees F. for a period of approximately sixteen hours in a non-oxidizing atmosphere as above specified during which time the vulcanizing reaction between the resin and sulphur takes place with the elimination of approximately 42% of the original sulphur employed. This sulphur escapes as hydrogen sulphide and perhaps other fugitive products of sulphur leaving the relatively large amount of sulphur in combination with the resin. With the above stated proportions the remaining sulphur is found to be approximately 12% by weight of the final product.

It is known that cumarone-indene resins possessing different physical consistencies and melting points are now available on the market, and in practicing the present invention, it is preferable to employ a resin having a relatively low melting point in order to provide flowability in the initial molding operation. It is on this account that the resin possessing a melting point of approximately twenty five degrees C. is specified as preferable but it is to be understood that the invention is not to be limited to a resin of any particular melting point as the moldability of the composition is ofttimes governed by various other factors.

The finished articles resulting from the above process are found to possess a higher mechanical strength than products produced from unvulcanized cumarone-indene resins and are also found to have a dielectric strength which is appreciably greater than that of cold molded articles heretofore obtained. The finished products possess a jet black appearance and have a desirable smooth, shiny surface. The mechanical strength of these articles compares favorably with those of other cold molded articles now on the market. Articles produced in accordance with this invention are highly desirable for numerous commercial uses and are particularly useful for electric appliances where the unusually high dielectric strength makes for marked improvement.

We claim:

1. A resinous composition of matter possessing properties adapting it for the formation of articles therefrom by cold-molding processes comprising the reaction product of a cumarone-indene resin and sulphur containing approximately 40% of sulphur by weight of the entire mass.

2. A resinous composition of matter possessing properties adapting it for the formation of articles therefrom by cold-molding processes comprising the reaction product of a cumarone-indene resin and sulphur containing approximately 40% of sulphur by weight of the entire mass, and a filler.

3. The process which consists in heat treating one part by weight, of a cumarone-indene resin with approximately two and one-half parts by weight, of sulphur for approximately sixteen hours at a temperature of between substantially 480 degrees and 500 degrees F.

4. The process of producing a cold molding composition which consists in mixing the following ingredients in the proportion specified to form a moldable mass: 31 parts by weight, of a cumarone-indene resin; 69 parts by weight, of sulphur, and a filler.

5. The process of producing a cold molding composition which consists in mixing the following ingredients in the proportion specified to form a moldable mass:

| | Parts by weight |
|---|---|
| Cumarone-indene resin | 31 |
| Sulphur | 61 |
| Filler | 160 |

6. A finished molded article produced by first, molding to desired shape the molding composition produced by the process set forth in claim 4, and then heat treating the molded article at a temperature of between approximately 480 degrees to 500 degrees F. for substantially sixteen hours.

7. A finished molded article produced by first, molding to desired shape the molding composition produced by the process set forth in claim 5, and then heat treating the molded article at a temperature of between approximately 480 degrees F. to 500 degrees F. for substantially sixteen hours.

8. A finished molded article produced by first, molding to desired shape the molding composition produced by the process set forth in claim 4, and then heat treating the molded article at a temperature of between approximately 480 degrees to 500 degrees F. for substantially sixteen hours, in a non-oxidizing atmosphere.

9. A finished molded article produced by first, molding to desired shape the molding composition produced by the process set forth in claim 5, and then heat treating the molded article at a temperature of between approximately 480 degrees to 500 degrees F. for substantially sixteen hours in a non-oxidizing atmosphere.

10. The process which comprises reacting by heat treatment and as sole reactants, a cumarone-indene resin and sulphur and thereby vulcanizing said resin to produce a vulcanizing resinous product.

CLARENCE A. HERBST.
JOHN D. ENDRIZ.